Patented Mar. 28, 1939

2,152,152

UNITED STATES PATENT OFFICE 2,152,152

DENTAL INVESTMENT OR REFRACTORY MATERIAL

Emil M. Prosen, Philadelphia, Pa., assignor to Nobilium Products, Inc., Philadelphia, Pa., a corporation of Pennsylvania No Drawing. Application July 28, 1937,
Serial No. 156,231

2 Claims. (Cl. 22—188)

This invention relates to certain new and useful improvements in dental investment or refractory material.

In the manufacture of a dental investment or molding material for the molding of metal alloys for dental work and the like, different materials are combined to produce a substance of a cementitious character that is reduced to a plastic or semi-plastic state, molded into the desired shape and thereafter allowed to set for hardening and the time required for the setting of such investment or refractory material may vary from ten hours to thirty days, according to the degree of hardness desired.

It is the primary object of this invention to provide an investment or refractory material for the making of molds for the casting of stainless steel used in dental work wherein the combining of certain materials in relatively critical proportions will produce a substance of a cementitious character which will set and attain the desired hardness of two to thirty minutes according to the relative proportions of the ingredients to effect a saving of time in the production of the investment or refractory material for the molding of stainless steel articles.

A further object of the invention is to provide an investment or refractory material for the casting of stainless steel used in dental work wherein by the combining of certain materials to form the investment or refractory, the coefficient of expansion of the investment material is substantially the same as the stainless steel metal alloy so that a more perfectly formed metallic element may be obtained.

To produce the dental investment or refractory material, magnesia or magnesium oxide is mixed with silica, the mixture being reduced to a plastic or semi-plastic state by means of phosphoric acid, preferably a ten percent solution of phosphoric acid diluted by water to facilitate molding of the investment into the desired shape. The binder of the investment or refractory comprises the magnesia and phosphoric acid solution and the quantity of magnesia employed in producing the investment or refractory may vary over a range of from one to twenty-five per cent with respect to the silica. In the higher ranges of the amount of magnesia employed, for instance ten to twenty-five percent with respect to the silica, a more rapid setting of the investment or refractory is accomplished.

After numerous experiments with silica, magnesia and a ten percent solution of phosphoric acid, it has been found that the most desirable results are obtained when the materials are used in the following proportions, to wit: ninety-five (95) percent of silica and five (5) percent of magnesia, a ten (10) percent solution of phosphoric acid being added to render the mixture plastic or semi-plastic for mold packing. It has been found that when the materials are used in the foregoing specific or critical proportions, precipitation and setting to the desired degree of hardness for heat treatment in the casting of dental elements is accomplished in a period of time from two minutes to fifteen minutes. As the magnesia and phosphoric acid constitute the binder, the time required for hardening is varied in accordance with the amount of magnesia used in proportion to the silica.

The investment or refractory material is especially adapted for use in making dental castings of stainless steel and when the materials of the investment or refractory are combined in the critical proportions recited, it has been found in actual practice that the investment or refractory possesses maximum expansion characteristics when subjected to heat during a casting operation while contracting substantially coincidentally to contacting movement of the stainless steel dental castings being molded in the investment or refractory so that the finished dental casting will possess the exact configuration intended therefor when completed. There is a minimum of contraction of the investment or refractory during setting and hardening thereof so that a most accurate mold can be made when the materials of the investment or refractory are used in the proportions stated.

From the above detailed description of the invention, it is believed that the same will at once be understood, and while it has been stated therein that critical proportions of the materials produce the most favorable results, it is understood that such proportions may be varied and if desired, other materials may be substituted for the ones specifically recited.

I claim:—

1. In a refractory for dental castings wherein the shrinkage of metal cast therein is compensated by a corresponding expansion of the refractory, and wherein the refractory is capable of setting with a phosphoric acid solution, said refractory comprising 95% of silica quartz, 5% of magnesia as a bonding agent and a quantity of a 10% solution of phosphoric acid to reduce the mixture to a moldable state.

2. In a refractory for dental castings wherein the shrinkage of metal cast therein is compensated by a corresponding expansion of the refractory and wherein the refractory is capable of quickly setting with a phosphoric acid solution in from 2 to 15 minutes at atmospheric temperatures, said refractory comprising a silica quartz vehicle from 90% to 95%, a magnesia bonding agent from 5% to 10% and a phosphoric acid solution in a quantity sufficient to reduce the mixture to a moldable state.

EMIL M. PROSEN.